Aug. 30, 1938.  M. P. BLOMBERG  2,128,281

RAILWAY VEHICLE TRUCK AND BODY INTERLOCK

Filed Feb. 13, 1937

Inventor
Martin P. Blomberg.
By Blackmore, Spencer & Flint
Attorneys

Patented Aug. 30, 1938

2,128,281

UNITED STATES PATENT OFFICE 2,128,281

RAILWAY VEHICLE TRUCK AND BODY INTERLOCK

Martin P. Blomberg, Hinsdale, Ill., assignor to General Motors Corporation, Detroit, Mich., a corporation of Delaware Application February 13, 1937, Serial No. 125,534

9 Claims. (Cl. 105—200)

This invention relates to railway vehicles, and has to do particularly with an interlocking device which will prevent the wheel truck from accidentally becoming separated from the vehicle body.

The common practice in railway vehicle construction is to provide a king pin for this purpose, the king pin passing through the center of the pivotal connection between the truck and the vehicle body, but in some types of vehicles where power or other equipment is mounted over the center of the pivotal connection, and an axle or some other part of the truck is located beneath such connection, it is difficult or impossible to install a king pin in place.

It has heretofore been proposed to avoid the use of a king pin by employing a locking device which was secured to the underside of the vehicle body and which cooperated with the side bearing on the truck to prevent accidental separation of the truck from the body. It is possible to use such a device when the side bearings are located outside the vehicle wheels, since in such a construction, the locking device is so located that it will be readily accessible for installation or removal purposes, but where the side bearings are located between the vehicle wheels to reduce weight or for any other reason, it is not feasible to employ locking devices such as have heretofore been known, since it would be very difficult to install or remove them without running the vehicle over a pit, and it is sometimes impossible to do that.

Therefore I have devised an interlocking device which may be installed or removed from within the vehicle body, the construction of it being such that everything that it is necessary to do to assemble it in or remove it from operative position may be done from above, it therefore not being necessary under any conditions to obtain access to the underside of the body or to the center portion of the truck in connection with the installation or removal of the interlocking device.

Another purpose served by my improved interlocking device is that it may easily be made to limit swinging movement of the truck relative to the vehicle body, thus eliminating the necessity for the chains which are ordinarily used for this purpose.

Other objects and advantages will appear upon reference to the following description and accompanying drawing, in which Fig. 1 is a side elevation of a six wheel truck.

Figure 1:
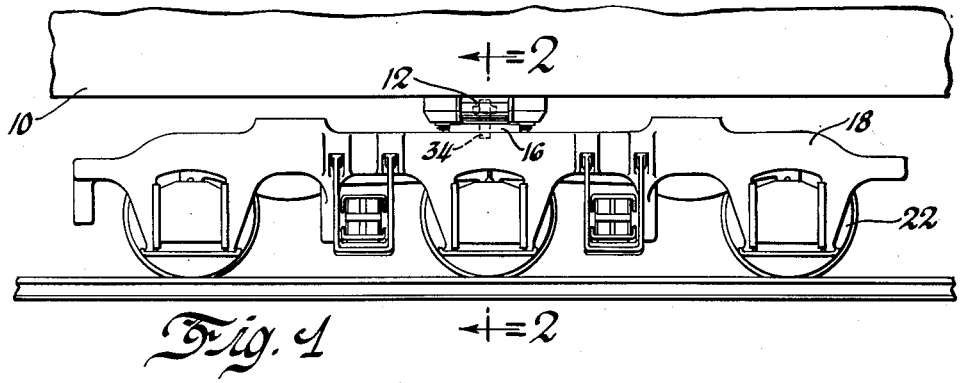
Figure 2:
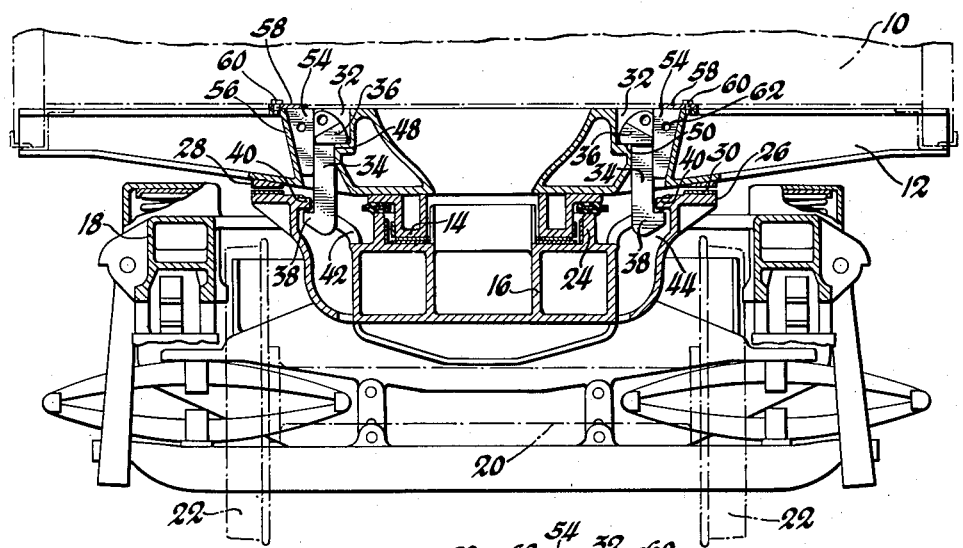
Fig. 2 is a vertical transverse section, taken on the line 2—2 of Fig. 1, on a somewhat larger scale.

The reference numeral 10 indicates a vehicle body to the underside of which is secured a body bolster 12, which has attached to its underside a center bearing member 14 which is of circular shape. 16 is a truck bolster which is connected conventionally to the truck frame 18, in which the axle 20 carrying the wheels 22 is journalled in the usual manner. Projecting upwardly from the top surface of the truck bolster is a circular flange 24 within which the center bearing member 14 is adapted to fit, to form a pivotal connection between the truck and the vehicle body. Side bearing portions 26 are provided on the truck bolster and these are adapted to bear against pads 28 secured to the underside of the body bolster, wear plates 30 being located between the adjacent surfaces of these parts.

It will be seen that while the above described structure will serve to pivotally connect the truck to the vehicle body and will prevent lateral movement of the one relative to the other, it would be possible for the body to move upwardly relative to the truck, and should a sufficient amount of such movement take place, the truck would become separated from the body. Ordinarily a king pin is employed at the center of the point of connection of the truck to the body to prevent this, but as heretofore explained, it is not always possible to use such a construction.

I have therefore devised an interlocking device which may be installed or detached from within the vehicle body. In this construction, passageways 32 are formed through the body bolster 12, one of these passageways being located on each side of the center of the pivotal connection between the truck and the body bolster. Since the interlocking devices used on each side are identical, only one will be described.

This consists of a member 34 which is provided with a head portion 36 at its upper end and which has a hook portion 38 formed at its lower end. The hook portion is adapted to fit under a flange 40 which is provided on the inside of the side bearing on the truck bolster, this flange together with side walls 42 forming a pocket 44 in the truck bolster. Since the member 34 is to be assembled from the inside of the body, some provision must be made to permit the insertion of the hook portion past the flange 40, and I have therefore formed the lower portion 46 of the wall 48 of the passageway so that it will extend at an angle with respect to the vertical.

Figure 3:
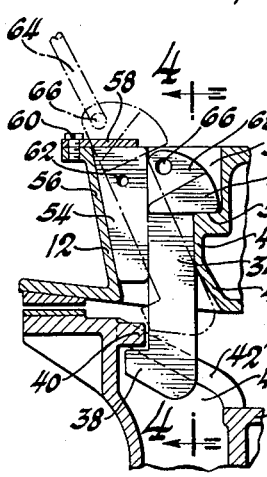
Fig. 3 is a fragmentary view, on a still larger scale, of the structure employed for locking the truck to the vehicle body.
Figure 4:
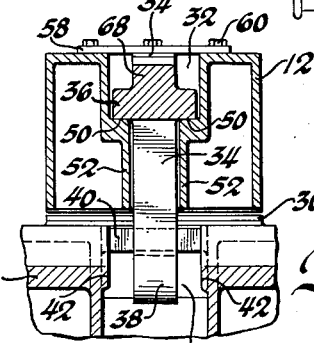
Fig. 4 is a section taken on the line 4—4 of Fig. 3.

As shown in Fig. 3, this permits the member 34 to be tilted to the position shown by the dot and dash lines, in which position the hook portion may be lowered past the flange 40, after which the member 34 may be moved to the position indicated in full lines in this figure. The member is supported in this position in the passageway by the engagement of the head portion 36 with shoulders 50 formed in the side walls 52 of the passageway, as shown in Fig. 4.

To positively hold the member 34 in this position, a wedge-shaped member 54 is inserted between the member 34 and the wall 56 of the passageway, this latter wall extending at a slight angle with respect to the vertical, so that as the wedge-shaped member is forced downwardly between the wall 56 and the member 34, the latter will be wedged against the wall 48 and will thereby be positively held in position.

To retain the wedge-shaped member in the location in which it serves to lock the member 34 in operative position, I provide a plate 58 which fits against the top of the wedge-shaped member and is secured to the top of the body bolster 12 by any suitable fastening means such as the bolt 60.

To assist in removing the parts when it is desired to disassemble them, the wedge-shaped member has an opening 62 formed through it, and as shown in Fig. 3, the end of a suitably shaped rod or tool 64 may be inserted into the opening 62, and the wedge-shaped member may then be withdrawn, after which the end of the rod or tool 64 may be inserted into an opening 66 formed through the narrowed portion 68 of the head of the member 34, and by tilting the latter as shown in Fig. 3, it may then be withdrawn.

It will be obvious from the above that should the body of the vehicle tend to move upwardly for any reason, the hook portion 38 of the member 34 will engage the flange 40, and the truck will thereby be caused to move upwardly with the body, thus preventing separation of the two. Should it become necessary to remove the truck for repair purposes, this may be done by removing the members 34 as explained in the preceding paragraph.

As described above, the lower end of the member 34 fits within the pocket 44, there being sufficient clearance between the sides of the member 34 and the walls 42 of the pocket to permit the truck to swing the maximum amount necessary in going around curves, but should the truck become derailed, further swinging movement of it would be prevented by one of the walls 42 coming into contact with the member 34. Chains are usually employed to connect the truck to the body to limit the swinging movement, but when using my improved interlocking device, these are not necessary.

As will be seen from the above, I have thus provided a simple but effective interlocking device which may be easily and quickly installed or removed from within the vehicle body, and which will also serve the additional purpose of limiting swinging movement of the truck relative to the body, thereby rendering it unnecessary to employ chains or any other devices for this purpose.

While I have shown and described a particular form of device the invention may be embodied in, it will be understood that various changes in form and details of construction may be made without departing from the scope of the appended claims.

I claim:

1. In combination, a vehicle body bolster having a passageway formed therethrough, said passageway having an angularly extending surface formed therein, a truck pivotally connected to the bolster, a member adapted to be inserted into said passageway from the top thereof, said member being adapted to engage a portion of the truck to prevent vertical separation of the truck from the bolster, and a wedge-shaped element cooperating with the member and the angularly extending surface to hold the member in operative position in the passageway.

2. In combination, a vehicle body bolster having a passageway formed therethrough, said passageway having an angularly extending surface formed therein, a truck pivotally connected to said bolster, a member adapted to be inserted into said passageway from the top thereof, said member being adapted to engage a portion of the truck to prevent the body from moving upwardly with respect to the truck, a wedge-shaped element cooperating with the member and the angularly extending surface to hold the member in operative position in the passageway, and means secured to the top of the bolster serving to secure the wedge-shaped element in position.

3. In combination, a vehicle body bolster having a passageway formed therethrough, a truck pivotally connected to the bolster, said truck having a flange formed thereon, a member having a hook portion formed at its lower end, said member being insertable into said passageway from the top thereof in tilted position so that the hook portion may pass below the flange, after which the member is moved to another position, in which position the hook portion will lie under the flange to prevent vertical separation of the bolster from the truck, and means serving to lock the member in the last named position.

4. In combination with a vehicle body and a truck pivotally connected thereto, said body having a passageway extending through its bottom portion, a member having a hook portion formed at its lower end, said member being insertable into the passageway from within the body and being adapted to be tilted in the passageway to allow the hook portion to extend below a part of the truck, said hook portion when the member is moved to operative position in the passageway being adapted to engage the truck to limit movement of the truck relative to the body.

5. In combination with a vehicle body and a truck pivotally connected thereto, said body having a passageway extending through its bottom portion and said truck having a pocket formed therein, a member having a hook portion formed at its lower end, said member being insertable into the passageway from within the body and being adapted to be tilted in said passageway to allow the hook portion to extend below a part of the truck, said hook portion when the member is moved to operative position being adapted to extend into said pocket in the truck and being adapted to engage the top wall of the pocket to prevent vertical separation of the body from the truck and to engage the side walls of the pocket to limit swinging movement of the truck relative to the body.

6. In combination with a vehicle body and a truck pivotally connected thereto, said body having a passageway extending through its bottom portion, a member having hook portions formed at both its lower and upper ends, said member being insertable into the passageway from within the body and being adapted to be tilted in the passageway to allow the hook portion at its lower end to extend below a part of the truck, said hook portion when the member is moved to operative position in the passageway being adapted to engage the truck to limit movement of the truck relative to the body, and the hook portion at the upper end of the member being adapted when the latter is in operative position to rest on the body for the purpose of supporting the member in position in the passageway.

7. In combination with a vehicle body and a truck pivotally connected thereto, said body having a passageway extending through its bottom portion, a member having a hook portion formed at its lower end, said member being insertable into the passageway from within the body and being adapted to be tilted in the passageway to allow the hook portion to extend below a part of the truck, said hook portion when the member is moved to operative position in the passageway being adapted to engage the truck to limit movement of the truck relative to the body, and an element adapted to cooperate with the member for the purpose of holding the latter in operative position in the passageway, said element being accessible from within the body.

8. In combination with a vehicle body and a truck pivotally connected thereto, said body having a passageway extending through its bottom portion, a member having a hook portion formed at its lower end, said member being insertable into the passageway from within the body and being adapted to be tilted in the passageway to allow the hook portion to extend below a part of the truck, said hook portion when the member is moved to operative position in the passageway being adapted to engage the truck to limit movement of the truck relative to the body, and an element adapted to be inserted into the passageway from within the body, said element serving to hold the member in operative position in the passageway.

9. In combination with a vehicle body and a truck pivotally connected thereto, said body having a passageway extending through its bottom portion, a member having a hook portion formed at its lower end, said member being insertable into the passageway from within the body and being adapted to be tilted in the passageway to allow the hook portion to extend below a part of the truck, said hook portion when the member is moved to operative position in the passageway being adapted to engage the truck to limit movement of the truck relative to the body, an element adapted to be inserted into the passageway from within the body, said element serving to hold the member in operative position in the passageway, and means connected to the body serving to retain said element in the passageway.

MARTIN P. BLOMBERG.